US008824277B2

(12) United States Patent
Le Roux et al.

(10) Patent No.: US 8,824,277 B2

(45) Date of Patent: Sep. 2, 2014

(54) METHOD OF ROUTING A DATA PACKET VIA A ROUTER IN A PACKET COMMUNICATIONS NETWORK SUPPORTED BY A TRANSPORT NETWORK

(75) Inventors: Jean-Louis Le Roux, Lannion (FR); Géraldine Calvignac, Trebeurden (FR)

(73) Assignee: Orange, Paris (FR)

( * ) Notice: Subject to any disclaimer, the term of this patent is extended or adjusted under 35 U.S.C. 154(b) by 1018 days.

(21) Appl. No.: 12/517,904

(22) PCT Filed: Dec. 17, 2007

(86) PCT No.: PCT/FR2007/052539

§ 371 (c)(1), (2), (4) Date: Jul. 14, 2009

(87) PCT Pub. No.: WO2008/087319

PCT Pub. Date: Jul. 24, 2008

(65) Prior Publication Data

US 2011/0019537 A1 Jan. 27, 2011

(30) Foreign Application Priority Data

Jan. 9, 2007 (FR) ..................................... 07 52589

(51) Int. Cl.
*H04L 12/701* (2013.01)
*H04L 12/56* (2006.01)

(52) U.S. Cl.
CPC ................ *H04L 45/00* (2013.01); *H04L 45/22* (2013.01)
USPC .......................................................... 370/225

(58) Field of Classification Search
CPC ................................ H04L 45/22; H04L 45/00
USPC .......................................................... 370/225
See application file for complete search history.

(56) References Cited

U.S. PATENT DOCUMENTS

| | | | | |
|---|---|---|---|---|
| 5,850,505 | A | 12/1998 | Grover et al. | |
| 2002/0031107 | A1 * | 3/2002 | Li et al. | 370/338 |
| 2002/0057651 | A1 * | 5/2002 | Roberts | 370/235 |
| 2003/0043756 | A1 * | 3/2003 | Reynders et al. | 370/254 |
| 2003/0161304 | A1 * | 8/2003 | deBoer et al. | 370/386 |
| 2003/0174644 | A1 * | 9/2003 | Yagyu | 370/228 |
| 2003/0233474 | A1 * | 12/2003 | Yamamoto | 709/239 |

OTHER PUBLICATIONS

Kirstaedter et al., "An Extended QoS Architecture Supporting Differentiated Resilience Requirements of IP Services," IETF Standard-Working-Draft, Internet Engineering Task Force, IETF, CH, pp. 1-16 (Jul. 2000).

(Continued)

*Primary Examiner* — Jason Mattis
*Assistant Examiner* — Stephen J Clawson
(74) *Attorney, Agent, or Firm* — Drinker Biddle & Reath LLP

(57) ABSTRACT

The invention relates to a method of routing a data packet via a router (12) in a packet communications network (1) supported by a transport network, said method including a step of determining from said packet a required back-up level and a required route. It further includes:

a preliminary step of establishing a table storing for a given route links (Ifp1-Ifp6) of the transport network able to provide said route and classified by back-up level; and a step of selecting a link of said transport network in the table on the basis of the required back-up level and the required route.

8 Claims, 2 Drawing Sheets

(56) References Cited

OTHER PUBLICATIONS

Owens et al., "Network Survivability Considerations for Traffic Engineered IP Networks," IETF Standard-Working-Draft, Internet Engineering Task Force, IEFT, CH, No. 2, pp. 1-18.

Wei et al., "Multi-Layer Differentiated Integrated Survivability for Optical Internet," Photonic Network Communications, vol. 8 (3), pp. 267-284 (Nov. 2004).

* cited by examiner

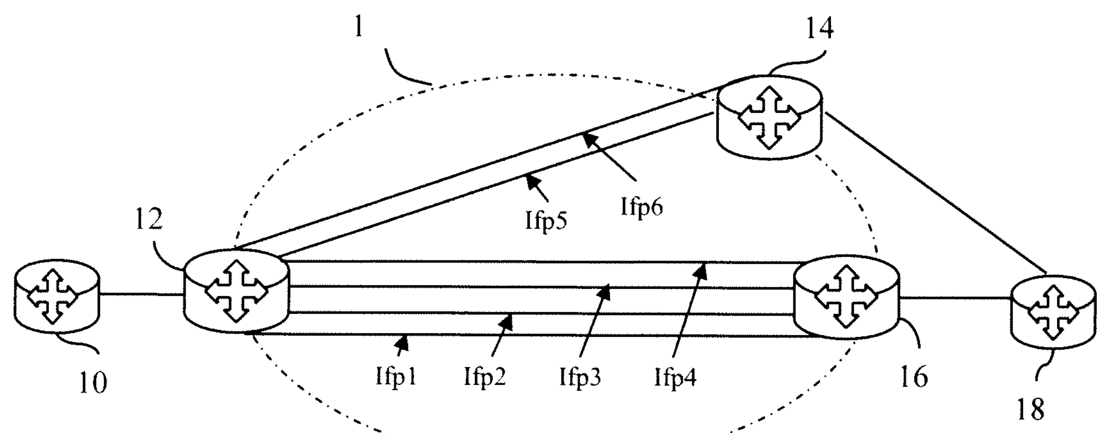
Figure 1
| 10.0.0.1 | RC1 | Ifp1, Ifp6 |
|---|---|---|
| | RC2 | Ifp2, Ifp3 |
| | RC3 | Ifp4, Ifp5 |
| | Def | Ifp4, Ifp5 |
Figure 2
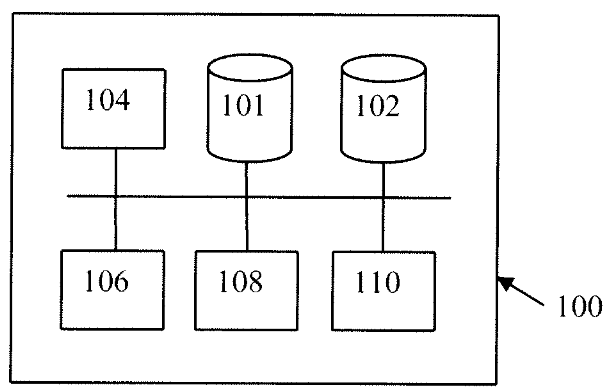
Figure 3

METHOD OF ROUTING A DATA PACKET VIA A ROUTER IN A PACKET COMMUNICATIONS NETWORK SUPPORTED BY A TRANSPORT NETWORK

CROSS-REFERENCE TO RELATED APPLICATIONS

This application is the U.S. national phase of the International Patent application No. PCT/FR2007/052539 filed Dec. 17, 2007, which claims the benefit of French application No. 07 52589 filed Jan. 9, 2007, the entire content of which is incorporated herein by reference.

FIELD OF THE INVENTION

The invention relates to a method of routing a data packet via a router in a packet communications network supported by a transport network.

To be more precise, the present invention applies to a network with an architecture conforming to a multilayer model in which a packet communications network, for example the IP network, is supported by a transport network. The transport network can be of SDH (synchronous digital hierarchy) type or of the optical type, for example employing wavelength-division multiplexing (WDM). The transport network provides connections that are seen by the packet communications network as point-to-point connections. The packet communications network acts as a client of the transport network. Moreover, the routing protocol in the packet communications network and the routing protocol in the transport network are independent.

BACKGROUND OF THE INVENTION

Differentiated link back-up mechanisms are generally provided in the transport network. These mechanisms differ in their restore times in the event of a fault and in the bandwidth consumed to back up the link of the transport network. The faster these mechanisms restore traffic after a fault, the more resources they consume. The following back-up mechanisms can be mentioned by way of example:

- 1+1 Protection, where the traffic is transmitted simultaneously on two links in parallel;
- N:1 Protection, where N links share one back-up link and route their traffic on that link in the event of a fault; and
- Restore Protection, where in the event of a fault the network attempts to set up a new path as quickly as possible.

All of the traffic between two routers is conveyed by one link or by a plurality of links, depending on the transport network back-up level.

This traffic is divided into a plurality of streams having different respective back-up requirements. A stream is characterized by various characteristics common to a plurality of packets. These characteristics, also known as identification elements, can be present in different layers of the OSI (Open System Interconnection) model. They can correspond to the contents of the source and/or destination address fields (layer 3) or to any other field in the headers of the packets, notably the protocol type (layer 3) and the port numbers for TCP or UDP segments (layer 4). Some streams require a very high levels of back-up, for example streams linked to real-time applications requiring breaks to have a duration of less than around 100 milliseconds, while other streams are more tolerant of breaks and therefore do not require a high back-up level. At present, all traffic is backed up to the same level and if a high level of back-up is chosen in the transport network this implies an unjustified consumption of resources to back up streams that would otherwise have required only a lower level of back-up.

In the document entitled "Recovery Time Analysis of Differentiated Resilience in MPLS" by A. Autenrieth, published in the proceedings of the DRCN2003 conference, a method of backing up streams, notably in a label-switched or MPLS network, is defined as a function of a parameter representative of the recovery time, called the resilience class (RC). To each value of the parameter RC there corresponds a back-up level and therefore a back-up procedure in the MPLS network adapted to the required back-up level. For example, for streams to be routed in the MPLS network requiring a very high back-up level, denoted RC1, i.e. a recovery time less than around 100 ms, a back-up label-switched path is set up beforehand on which the streams corresponding to the parameter value RC1 are conveyed in the event of fault in the main path. Accordingly, in the event of a fault, the recovery time of these streams is less than the required value.

In the document "Optical Layer Survivability: a Services Perspective" by O. Gerstel and R. Ramaswani, published in the journal "IEEE Communications Magazine" of March 2000, the authors touch on the problem of networks with architectures conforming to a multiplayer model and identify the requirement for coordination in the event of a fault between the back-up mechanisms between the packet communications network as client of the transport network and the transport network itself. To this end, it defines five service classes for specifying which layer backs up the stream in order to avoid inefficient interaction between the back-up mechanisms. However, the transport network is not informed of the back-up level required by the packet communications network.

There is therefore a need for a technique for backing up traffic in a transport network in a differentiated manner as a function of requirements defined for each stream in a packet communications network in an architecture conforming to a multilayer model.

SUMMARY OF THE INVENTION

The invention responds to this need by proposing a method of routing a data packet via a router in a packet communications network supported by a transport network, said method including a step of determining from said packet a required back-up level and a required route, and being characterized in that it further includes:

- a preliminary step of establishing a table storing for a given route links of the transport network able to provide said route and classified by back-up level; and
- a step of selecting a link of said transport network in the table on the basis of the required back-up level and the required route.

As a function of the routing required for the packet, a table is consulted that stores, for a given route and for a required back-up level, at least one physical link of the transport network that offers that back-up level. Accordingly, the stream to which this packet belongs is backed up in the transport network as a function of a back-up level defined in the packet communications network. Thus optimum use is made of the resources of the transport network. The consumption of resources in the transport network is adapted to the back-up level required in the packet-communications network. Furthermore, there is no harmful interaction between the back-up mechanisms of the transport network and those of the packet-communications network. The back-up level can be defined implicitly in the packet by combining different fields. It can also be coded explicitly when the packet enters the multilayer network.

Moreover, in the step of establishing the table, for a given route to be effected via the router in the communications network, the router determines all of the links of the transport network supporting said route and respective associated back-up levels and associates with a given back-up level in the table at least one link of the corresponding transport network.

Thus a table is obtained that stores, for a given route and for a given back-up level, at least one link of the transport network able to provide that route and that back-up level. This table is generated at initialization time and is adapted to the actual configuration of the transport network. The routing table or IP routing table provides no information about the logical links. The table of the invention is set up in part by consulting two tables, one that stores for each logical link at least one link of the transport network and another that stores a back-up level for a link of the transport network.

If load sharing is not active for a given back-up level, the step of establishing tables advantageously includes a sub-step of random selection of a link if the router has determined a plurality of transport network links.

Accordingly, and notably in a packet communications network, the router has only one output link in the table available if load sharing is not activated.

Furthermore, at least one link of the transport network is selected by default if the determination step cannot determine a back-up level.

Accordingly, if it is not possible to determine a required back-up level from information available in the packet, the traffic is routed correctly using default links.

The method advantageously further includes, at the time of modifying a route, a step of updating the table for said route.

At the time of events affecting the routing tables of the router, such as faults or messages announcing information sent by the routing control protocols, the table is updated so as to be always adapted to the routing of the packets.

The invention also provides a router in a packet communications network supported by a transport network, including:

- means for establishing a table storing for a given route links of the transport network able to provide said route and classified by back-up level;
- means for determining from a packet a required back-up level and a required route; and
- means for selecting a link of said transport network in the table on the basis of the required back-up level and the required route.

The invention further provides a system in a packet communications network supported by a transport network including at least one router as described above.

BRIEF DESCRIPTION OF THE DRAWINGS

The invention can be more clearly understood with the assistance of the following description of various particular implementations of the routing method of the invention, given with reference to the appended drawings, in which:

FIG. 1 represents a packet communications network;

FIG. 2 represents one particular example of storage in a routing table in a first particular embodiment of the invention;

FIG. 3 represents a functional block diagram of a router for implementing the first particular embodiment of the method of the invention;

DETAILED DESCRIPTION

Figures 4, 5:
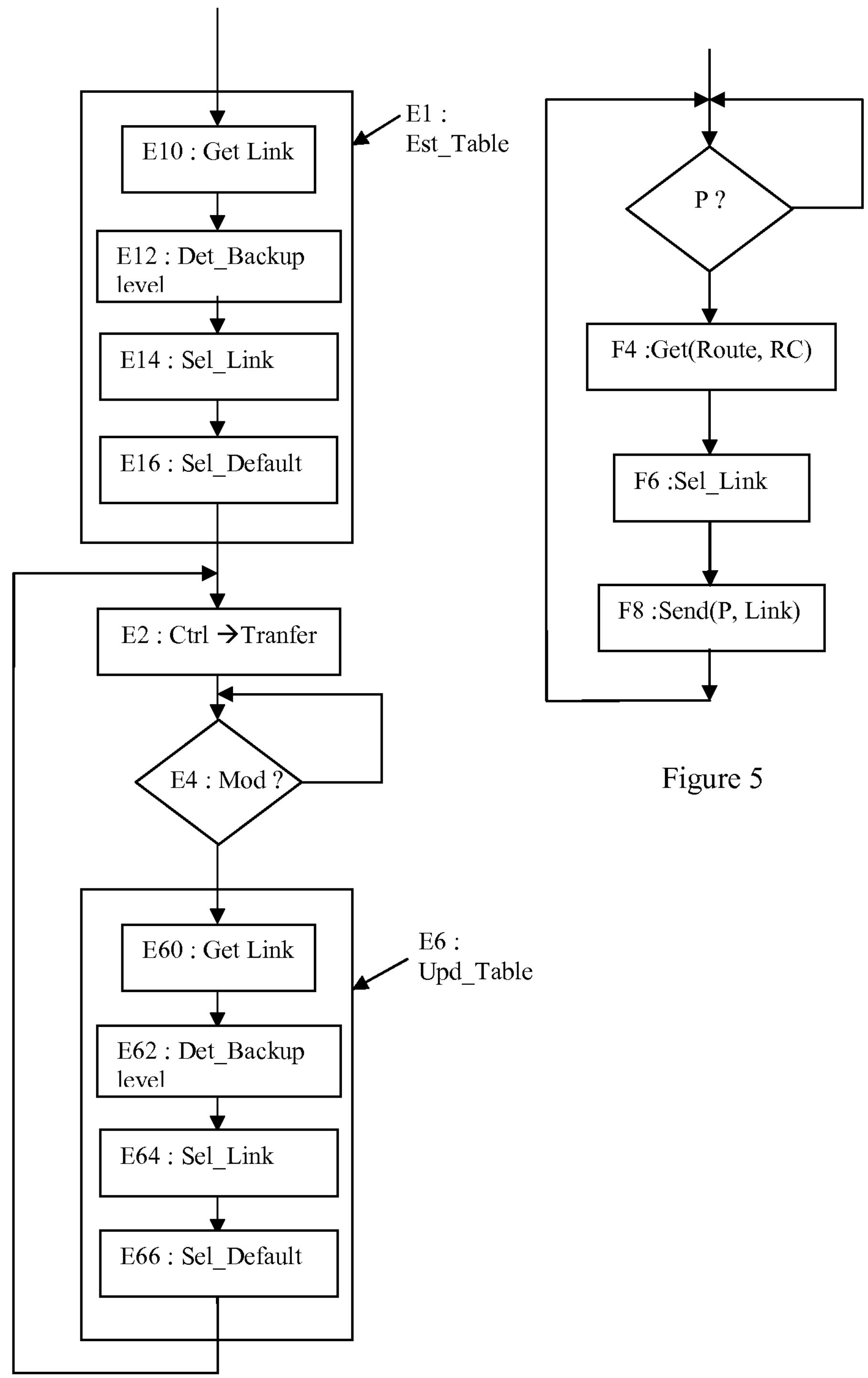
FIGS. 4 and 5 represent a flowchart of the steps of the method of the first particular embodiment of the invention.

FIG. 1 represents a packet communications network. The expression "packet communications network" refers to a network that transfers packets conveying information and that performs functions for routing the packets. The packets in question in the particular example of the present description are IP (Internet Protocol) packets. The transfer and routing functions are performed by units called routers. Routers 10, 12, 14, 16, and 18 are represented in FIG. 1. A portion of the packet communications network, designated by the reference 1 in FIG. 1, is supported by a transport network. Here the transport network is an SDH (synchronous digital hierarchy) network. It could equally be an optical transport network, for example one employing wavelength-division multiplexing (WDM) or any other type of network. Links in the transport network can be configured to provide a particular back-up level. The term "link" refers to a connection between two entities of the network situated at the opposite ends of the link. Note that these two entities can be connected to each other by a plurality of different links because they use respective different paths in the transport network, i.e. different physical paths or paths carried by different time slots, e.g. in an SDH transport network. This network portion 1 has an architecture conforming to a multilayer model. The transport network provides connections that are seen from the packet communications network as point-to-point connections. In other words, for a given connection in the transport network, the communications network knows which routers are located at the two ends of the connection but does not know any intermediate entities of the transport network located between those two end routers. The packet communications network acts as a client of the transport network. It supplies packets to the transport network, which is then responsible for routing them.

To be more precise, the routers 12, 14, and 16 are input routers of the network 1 with an architecture conforming to a multilayer model.

A plurality of links of the transport network are represented in FIG. 1. Four of them, with the references Ifp1 to Ifp4, connect the routers 12 and 16 and two of them, with the references Ifp5 and Ifp6, connect the routers 12 and 14. For clarity, only the links of the transport network necessary for the description are shown in FIG. 1. In the example that is expanded on in the remainder of the description, it is considered that:

- the links Ifp1 and Ifp6 have 1+1 Protection in the transport network, i.e. for each of these links the traffic is transmitted on the link and simultaneously on a parallel link that is not shown;
- the links Ifp2 and Ifp3 have 1:1 Protection in the transport network, i.e. each of these links has a respective back-up link, not shown, and routes its traffic on that link in the event of a fault;
- the links Ifp4 and Ifp5 have Restore Protection in the transport network, i.e. in the event of a fault on the link Ifp4, respectively Ifp5, the network attempts to set up as quickly as possible a new link between the routers 12 and 14, respectively between the routers 12 and 16.

According to the invention, the router 12 includes a table 101 of the links of the transport network, as shown in FIG. 3, that stores for each link a back-up level in the transport network. For example, if the back-up levels are defined so that the back-up level 1 corresponds to 1+1 Protection in the transport network, level 2 to 1:1 Protection, and level 3 to Restore Protection, then in the above example the links Ifp1, Ifp2, Ifp3, Ifp4, Ifp5, and Ifp6 in the transport network have respective back-up levels 1, 2, 2, 3, 3, 1.

Here the particular situation is that the router 10 must route data packets to the router 18.

In the example selected above, the destination address of the router 18 is 10.0.0.1.

There is described below and with reference to FIGS. 4 and 5 the method executed in the router 12 of routing a data packet in a packet communications network supported by a transport network.

FIG. 4 shows the step of the method as executed in the control plane of the router 12.

FIG. 5 shows the steps of the method as executed in the transfer plane of the router 12.

In the command plane, the method begins with a first step E1 of establishing a table 102, as shown in FIG. 3, storing for a given route links Ifp1-Ifp6 of the transport network able to provide that route and classified by back-up level.

This first step comprises four sub-steps.

In a sub-step E10, for a given route to be set up by the router in the communications network, i.e. for a destination address or for a group of destination addresses, the router 12 determines from a table referred to as the routing table or IP routing table a first set of at least one logical link, a logical link corresponding to one of the shorter paths for this route.

For each logical link, the router 12 stores at least one link of the associated transport network in a table called the IP bundles table. From the logical link so determined, it determines a second set comprising one or more links of the transport network supporting the route concerned.

From this sub-step E10, the method goes to a sub-step E12.

For each link of the second set of links in the transport network, the router 12 determines the associated back-up level from the table 101 of transport network links. It then associates the back-up level so determined with each link of the second set of links supporting the route concerned.

The router 12 is configured so that a back-up level in the transport network is matched with a parameter representing the recovery time and called the resilience class (RC). Three values of the parameter RC are defined, for example:

- the value RC1 corresponds to a required recovery time less than one hundred milliseconds;
- the value RC2 corresponds to a required recovery time between one hundred milliseconds and one second;
- the value RC3 corresponds to a required recovery time between one second and ten seconds.

The back-up levels 1, 2, 3 in the transport network are respectively matched with the values RC1, RC2, RC3 of the parameter RC.

In a sub-step E14, for each back-up level, there is extracted from the second set comprising links of the transport network supporting the route concerned a sub-set of one or more links of the transport network providing that back-up level and this sub-set, comprising at least one link of the transport network, is stored in the table 102. In other words, for the route concerned, the various links of the transport network are classified in the table 102 by the back-up level.

Then in a sub-step E16, the route concerned is also associated with a sub-set of links of the transport network for routing traffic to be used by default, i.e. if the back-up level cannot be determined or if there is no link of the transport network corresponding to a given back-up level.

Accordingly, following the sub-steps E14 and E16, the route concerned is associated in the table 102 with:

- a plurality of links classified into sub-sets by respective back-up levels RC1, RC2, and RC3, each back-up level thus being associated with a sub-set of at least one link; and
- a sub-set of default links, labelled Def, for use if the back-up level cannot be determined.

These sub-steps E10, E12, E14, and E16 are repeated for all of the routes to be effected by the router and contained in its routing table.

Following this step E1, there is obtained a table 102 comprising a plurality of records with the same structure as that of the particular example shown in FIG. 2. That example corresponds to the record obtained for routing IP packets to the destination address 10.0.0.1 of the router 18. With the back-up levels denoted RC1, RC2, and RC3 there are respectively associated the sub-sets of links {Ifp1, Ifp6}, {Ifp2, Ifp3} and {Ifp4, Ifp5}. The sub-set {If4, Ifp5}, labeled Def, corresponds to the sub-set of links to be used by default.

Optionally, if load sharing is not activated in the router 12 for a given back-up level, and if a plurality of links have been determined in the sub-step E14, the router selects a link at random and stores it in the table 102.

The method then goes to a step E2 of transferring the table 102 from the control plane to the transfer plane of the router. For reasons of readability, only one table is represented in FIG. 3 for both planes.

The method then goes to a step E4 of supervising modification of the routing table.

The modifications in the routing table can be generated by faults occurring on links, by information announcements sent by routing control protocols, etc.

If during the step E4 the router 12 detects that a modification has been made in the routing table for one or more routes, in other words in the embodiment described here for a destination address or a group of destination addresses, the method goes to the step E6 of updating the table 102 for the route or routes in question. If not, the method returns to the step E4.

The step E6 is executed in a manner equivalent to the step E1. For each route modified, sub-steps E60, E62, E64, and E66 are executed whose execution is identical to that of the steps E10, E12, E14, and E16, respectively.

Following step E6, the method again executes the step E2 of transferring the table 102 from the control plane to the transfer plane.

The routing method as executed in the transfer plane is described below with reference to FIG. 5.

In a step F2, the router 12 is waiting to receive data packets. On reception of a data packet, the router 12 determines in a step F4 a required back-up level from the packet received. The back-up level can be defined implicitly in the IP packet by combining various fields. It can also be an explicit code added when the IP packet enters the multi-layer network 1.

By way of examples of implicit coding, the required back-up level can be deduced by matching information contained in one or more fields of the TCP/IP, UDP/IP headers of an IP packet with a required back-up level:

- a combination of fields of the headers, for example as a function of the value of the DSCP (Differentiated Service Code Point) field and a TCP port number.

By way of examples of explicit coding, the required back-up level can be deduced by directly reading a field of the TCP/IP, UDP/IP headers of an IP packet:

- the field Flow Label IPv6;
- the field TOS (type of service), which contains the DSCP information and undefined bits.

In the step F4 the router 12 also determines the required route for the packet from the destination IP address.

In the particular example described here, this is a packet whose destination is the router 18, whose address is 10.0.0.1 and whose required back-up level is RC1.

During the step F6 of selecting a link of the transport network, the router 12 obtains, by reading the table 102 on the basis of the required route and the required back-up level, a sub-set of links of the transport network enabling routing of the packet and providing the required back-up level. In the example described here, the set {Ifp1, Ifp6} is obtained. If load sharing is active and if the sub-set comprises more than one link, the router selects one of the links, for example using a hashing function. The router 12 then sends the packet on the selected link in a step F8.

The method then returns to the step F2 of waiting to receive data.

In a second embodiment, the packet communications network 1 supported by a transport network is an MPLS type (Multi-Protocol Label Switching) network. A label is assigned to each data packet by an input router in the MPLS network. The MPLS packet is therefore routed in the MPLS network by a router as a function of the input label of the packet in the router and using a routing table called the label-switching table. In other words, the router determines a route for the MPLS packet as a function of its input label.

The method performs all of the steps E1, E2, E4, and E6 described for the first embodiment, notably to obtain a first table 102 storing for a given route, i.e. for a destination address or a group of destination addresses, links of the transport network able to provide that route and classified by back-up level.

Moreover, the method executes the step E1 as described for the first embodiment for each input label provided in the label-switching table and there is obtained after this step a second table, not represented in FIG. 3, comprising for an input label an output label and, for each back-up level, a sub-set of links of the transport network for routing the traffic.

Likewise, at the time of a modification to the label-switching table detected during the step E4, the method executes the step E6 for each modified route.

The step E2 of transferring the second table into the transfer plane is unchanged.

Following the above steps, the router 12 contains two routing tables in the control and transfer planes: the first table 102 for routing IP packets, the second table for routing MPLS packets.

In the transfer plane, during the step F4 of determining a required back-up level and a route, the router determines the required route as a function of the header of the received packet.

If it is an IP packet, the required route for the packet is determined from the destination IP address. In this situation, step F6 of selecting a link of the transport network is executed as described for the first embodiment, by reading the first table 102. The step F8 is executed as described for the first embodiment.

If it is an MPLS packet, the required route is determined from the input label in the received packet. In the step F6 of selecting a link of the transport network, the router reads the second table to obtain the output label and a link of the transport network that can route the packet. Before the step F8, the router 12 also modifies the routing label in the packet, replacing it with the output label read in the second table. Then, in the step F8, it sends the packet on the selected link.

The back-up level can be defined implicitly in the MPLS packet by combining various fields. It can also be an explicit code added when the MPLS packet enters the multilayer network 1.

Complementing the examples of implicit and explicit coding already described for the first embodiment, the required back-up level can be deduced by matching information contained in one or more fields of the TCP/IP, UDP/IP or MPLS headers of an MPLS packet with a required back-up level, for example:

using the EXP field of the MPLS header;

using bits of the MPLS label.

In a first variant, if the router 12 is an input router of the MPLS network, the first table 102 also stores for a given route, i.e. for a destination address or a group of destination addresses, an output label and links of the transport network able to provide that route and classified by back-up levels.

In a second variant, if the router 12 is an output router of the MPLS network, the second table stores for an input label and for each back-up level a sub-set of links of the transport network for routing the traffic.

In a third variant, the router 12 is an input router of the packet communications network 1 supported by a transport network and in particular is in charge of switching data to a tunnel providing the route and conforming to the quality of service criteria.

Label switched path (LSP) tunnels, comprising a succession of routers, are created virtually in the network for routing packets from an input router to an output or destination router (final or transit destination) via transit routers. These tunnels are preset as a function of quality of service criteria. A tunnel corresponds to a label path. The explicit path is indicated in the MPLS header and enables end-to-end routing in the MPLS network. The router 12 determines as a function of a destination address and quality of service criteria contained in a data packet a tunnel for routing the packet and conforming to the quality of service criteria. The information linked to the tunnel is added by the input router of the network, for example the router 12.

The required route is determined from the destination address and required quality of service criteria. A tunnel and a logical interface in the packet communications network are associated with a route and quality of service criteria.

The method executes the step E1 as described for each (route/quality of service criteria) pair and there is obtained at the end of this step a table 102 comprising a set of tunnels able to route the traffic and conforming to the quality of service criteria for a (route/quality of service criteria) pair and for each back-up level.

The table 102 contains one or more associated tunnels for a (route/quality of service criteria) pair and for each back-up level. A tunnel is associated with a link of the transport network.

Note that a tunnel can be seen as a physical interface between two distant routers associated with a back-up level. The method as described above for the first embodiment therefore applies in an equivalent manner.

Likewise, in the event of modification of the routing table, the method executes the step E6 for each modified route.

The step E2 of transferring the table 102 to the transfer plane is unchanged.

Then, before the step F8, the router 12 adds the identifier of the selected tunnel and then, in the step F8, sends the packet on the corresponding link.

The back-up level can be defined implicitly or explicitly in the same manner as for the first and second embodiments.

This third embodiment is described for MPLS-TE tunnels. It is equally applicable to GRE (Generic Routing Encapsulation), IPSec (IP Security), and L2TP (Layer Two Tunneling Protocol) tunnels.

A router 100 for implementing the first embodiment of the method of the invention is described below with reference to FIG. 3. The router 100 is a router of the packet communications network 1 supported by a transport network.

The router 100 is adapted to receive packets in the transfer plane and to route them after processing to a link of the transport network.

It is also adapted to receive routing protocol announcements in the control plane and to produce a packet routing table.

The router 100 comprises:

a routing table (not shown in FIG. 3);

a table 101 of transport network links that stores a back-up level in the transport network for each link;

means 104 for setting up and updating a table 102, that store for a given route links Ifp1-Ifp6 of the transport network able to provide said route and classified by back-up level;

means 106 for determining from a packet a required back-up level and a required route;

means 108 for selecting a link Ifp1-Ifp6 of said transport network in the table 102 on the basis of the required back-up level and the required route required;

means 110 for routing packets on a link selected by the selector means 108.

The table 102 is duplicated in the control plane and in the transfer plane.

The modules 104, 106, 108, and 110 that implement the method described above are preferably software modules comprising software instructions for execution of the steps of the method described above by the router 100.

The software modules can be stored in or transmitted by a data medium. This can be a hardware storage medium, for example a CD-ROM, a magnet diskette or a hard disk, or a transmission medium such as an electrical, optical or radio signal, or a telecommunications network.

The invention also relates to a system in a packet communications network supported by a transport network including at least one router 12 as described above.

The invention claimed is:

1. A method of routing a data packet received at a router in a packet communications network supported by a transport network, said method comprising:

in the control plane, a preliminary step of establishing a table storing for a route a set of links of the transport network able to provide said route, wherein links are classified by back-up level in the transport network; and a step of transferring said table to the transfer plane; and in the transfer plane, a step of determining from fields of said packet a required back-up level in the transport network and a required route;

a step of selecting a link of said transport network from links stored for said required route in said transferred table, wherein said selected link is classified with said determined required back-up level; and a step of sending said packet on said selected link.

2. A method according to claim 1, wherein, in the step of establishing the table, for a given route to be effected via the router in the communications network, the router determines all of the links of the transport network supporting said route and respective associated back-up levels and associates with a given back-up level in the table at least one link of the corresponding transport network.

3. A method according to claim 2, wherein, if load sharing is not active for a given back-up level, the step of establishing tables includes a sub-step of random selection of a link if the router has determined a plurality of transport network links.

4. A method according to claim 1, in which at least one link of the transport network is selected by default if the determination step cannot determine a back-up level.

5. A method according to claim 1, further comprising, at the time of modifying a route, a step of updating the table for said route.

6. A router in a packet communications network supported by a transport network, comprising:

means for establishing in the control plane a table storing for a route a set of links of the transport network able to provide said route, wherein links are classified by back-up level in the transport network;

means for transferring said table to the transfer plane;

means for determining in the transfer plane from fields of a packet a required back-up level in the transport network and a required route;

means for selecting in the transfer plane a link of said transport network from links stored for said required route in said transferred table, wherein said link is classified with said determined required back-up level; and means for sending in the transfer plane said packet on said selected link.

7. A system in a packet communications network supported by a transport network including at least one router according to claim 6.

8. A non-transitory computer-readable storage medium storing instructions that, when executed on a processor, cause a router to route data packets in a packet communications network supported by a transport network by at least carrying out the steps of the method according to claim 1.

* * * * *